(12) United States Patent
Cook et al.

(10) Patent No.: US 10,528,544 B2
(45) Date of Patent: Jan. 7, 2020

(54) COOPERATIVE LOCKING BETWEEN DATABASES INTEGRATED WITH DISTRIBUTED PROGRAMMING ENVIRONMENTS

(71) Applicant: International Business Machines Corporation, Armonk, NY (US)

(72) Inventors: Alexander Cook, Rochester, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 15/636,156

(22) Filed: Jun. 28, 2017

(65) Prior Publication Data
US 2019/0005083 A1  Jan. 3, 2019

(51) Int. Cl.
*G06F 16/23* (2019.01)
*G06F 16/27* (2019.01)

(52) U.S. Cl.
CPC ...... *G06F 16/2343* (2019.01); *G06F 16/2365* (2019.01); *G06F 16/27* (2019.01)

(58) Field of Classification Search
CPC combination set(s) only.
See application file for complete search history.

(56) References Cited

U.S. PATENT DOCUMENTS

| | | | | |
|---|---|---|---|---|
| 6,009,463 A | * | 12/1999 | Brandt | H04L 49/90 709/212 |
| 7,962,458 B2 | * | 6/2011 | Holenstein | G06F 11/2094 707/704 |
| 8,769,485 B2 | | 7/2014 | Salz et al. | |
| 2005/0049996 A1 | * | 3/2005 | Srinivasan | G06F 16/83 |
| 2009/0296580 A1 | * | 12/2009 | Williams, Jr. | H04L 47/34 370/235 |
| 2015/0334143 A1 | | 11/2015 | Branson et al. | |
| 2018/0075075 A1 | * | 3/2018 | Barsness | G06F 16/2343 |
| 2018/0352016 A1 | * | 12/2018 | Barsness | H04L 43/0817 |

* cited by examiner

*Primary Examiner* — Shyue Jiunn Hwa
(74) *Attorney, Agent, or Firm* — Patterson + Sheridan, LLP

(57) ABSTRACT

Systems, methods, and computer program products to perform an operation comprising locking, by a first one of a database management system (DBMS) and a distributed application, one of a first database element and a first data tuple, wherein the first data tuple is of a plurality of tuples in an operator graph of the distributed application, transmitting an indication of the locking by the first one of the DBMS and the streams computing application to a second one of the DBMS and the distributed application, identifying, by the second one of the DBMS and the distributed application, one of a second database element and a second data tuple corresponding to the one of the first database element and the first data tuple, and locking, by the second one of the DBMS and the streams computing application, the identified one of the second database element and the second data tuple.

20 Claims, 12 Drawing Sheets

COOPERATIVE LOCKING BETWEEN DATABASES INTEGRATED WITH DISTRIBUTED PROGRAMMING ENVIRONMENTS

BACKGROUND

The present disclosure relates to data locking mechanisms, and more specifically, to cooperative data locking between databases integrated with distributed programming environments.

Databases are computerized information storage and retrieval systems. A relational database management system is a computer database management system (DBMS) that uses relational techniques for storing and retrieving data. Streams programming is an example of a distributed programming model. Streams applications built using the streams programming model consist of streams of data flowing through processing elements that form an operator graph. Data coming into the streams application is said to come in via a source operator in the operator graph, where the source operator processes the data and sends the processed data to the next operator, and so on. Ultimately, some or all of the data processed by the streams application may be stored in a database. As such, many databases have been enhanced to integrate with streams applications.

SUMMARY

In one embodiment, a method comprises locking, by a first one of a database management system (DBMS) and a distributed application, one of a first database element and a first data tuple, respectively, wherein the first data tuple is of a plurality of data tuples in an operator graph of the distributed application, transmitting an indication of the locking by the first one of the DBMS and the streams computing application to a second one of the DBMS and the distributed application, identifying, by the second one of the DBMS and the distributed application, one of a second database element and a second data tuple corresponding to the one of the first database element and the first data tuple, and locking, by the second one of the DBMS and the streams computing application, the identified one of the second database element and the second data tuple.

In another embodiment, a system comprises a processor and a memory storing instructions, which when executed by the processor, performs an operation comprising locking, by a first one of a database management system (DBMS) and a distributed application, one of a first database element and a first data tuple, respectively, wherein the first data tuple is of a plurality of data tuples in an operator graph of the distributed application, transmitting an indication of the locking by the first one of the DBMS and the streams computing application to a second one of the DBMS and the distributed application, identifying, by the second one of the DBMS and the distributed application, one of a second database element and a second data tuple corresponding to the one of the first database element and the first data tuple, and locking, by the second one of the DBMS and the streams computing application, the identified one of the second database element and the second data tuple.

In another embodiment, a computer-readable storage medium has computer-readable program code embodied therewith, the computer-readable program code executable by a processor to perform an operation comprising locking, by a first one of a database management system (DBMS) and a distributed application, one of a first database element and a first data tuple, respectively, wherein the first data tuple is of a plurality of data tuples in an operator graph of the distributed application, transmitting an indication of the locking by the first one of the DBMS and the streams computing application to a second one of the DBMS and the distributed application, identifying, by the second one of the DBMS and the distributed application, one of a second database element and a second data tuple corresponding to the one of the first database element and the first data tuple, and locking, by the second one of the DBMS and the streams computing application, the identified one of the second database element and the second data tuple.

DETAILED DESCRIPTION

Embodiments disclosed herein provide cooperative locking between a DBMS and a distributed computing application, such as a streams computing application. Generally, some or all of the data processed by a distributed application may be stored in a database, or modify existing data stored in the database. As such, when a lock is placed on data in the database of the DBMS, embodiments disclosed herein extend the lock to corresponding data in the distributed application. Similarly, when a lock is placed on data in the distributed computing application, embodiments disclosed extend the lock to corresponding data in the DBMS. Furthermore, if data in the distributed computing application is determined to update data in the database, the corresponding data in the database may be locked, allowing processing of the data in the distributed computing application to complete and update the database accordingly.

Figure 1A:
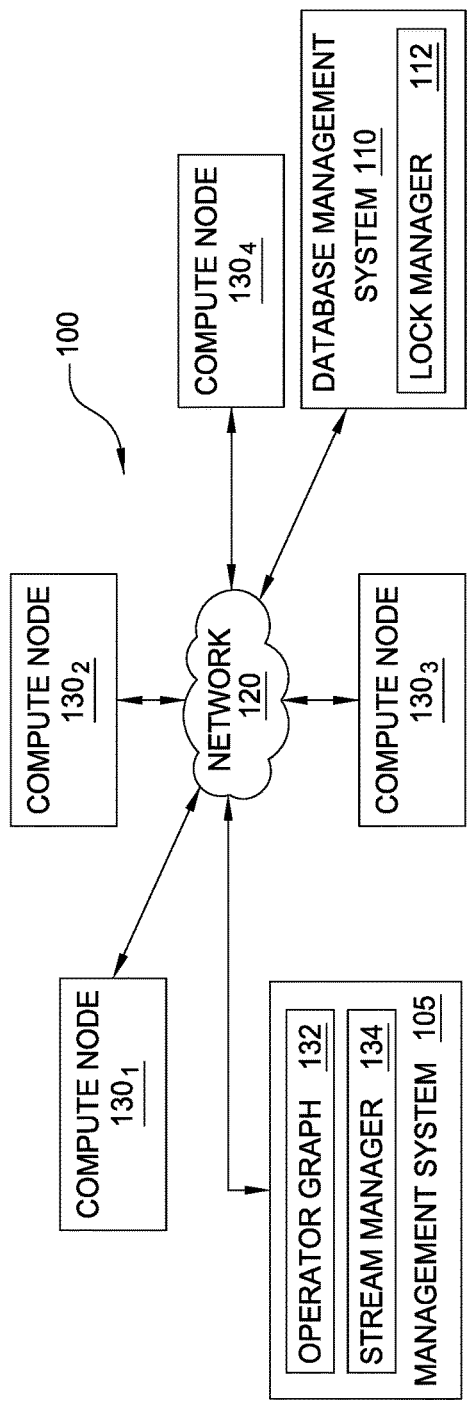
FIGS. 1A-1B illustrate a computing infrastructure that provides cooperative locking between databases that are integrated with distributed computing applications, according to various embodiments.

FIG. 1A illustrates a computing infrastructure 100 that provides cooperative locking between databases that are integrated with distributed computing applications, according to one embodiment. As shown, the computing infrastructure 100 includes a management system 105, a database management system 110, and a plurality of compute nodes $130_{1-4}$, each connected to a communications network 120. As shown, the management system 105 includes an operator graph 132 and a stream manager 134. As described in greater detail below, the operator graph 132 represents a streams computing application (an example of a distributed computing application) beginning from one or more operators in one or more source processing elements (PEs) through to one or more operators in one or more sink PEs. This flow from source to sink is also generally referred to herein as an execution path.

As shown, the DBMS 110 includes a lock manager 112, which controls data locking in a database (not pictured) of the DBMS 110, and extends locking in the database to the operator graph 132 of the streams computing application. Similarly, the lock manager 112 is configured to receive indications of locked data tuples in the operator graph 132, and lock corresponding data in the database of the DBMS 110. Generally, data locking is used to prevent simultaneous access to a unit of data. For example, software applications, operating systems, and, at the highest level, users may submit queries to the DBMS 110. These queries may modify data in the database. However, to prevent inconsistent results, the DBMS 110 may lock the data in the database such that only one actor can modify the data in the database. When data is locked, only the actor (e.g., an application) having the lock can modify the data in the database. Other actors that do not have the lock cannot modify the locked data until the lock is released. Once the actor holding the lock completes the intended operations to the data in the database (e.g., the data in the database is modified, and/or the intended operations otherwise time out), the lock is released, and other actors can request the lock to modify the data in the database.

For example, the lock manager 112 may lock an employee table (or any subset thereof) in the database of the DBMS 110. The lock manager 112 may then send an indication of the lock which identifies the employee table to the stream manager 134. The stream manager 134 may then identify data tuples in the operator graph 132 that may ultimately be stored in employee table (or otherwise modify the employee table), and lock the identified data tuples. Once the lock is released from the employee table, the lock manager 112 sends an indication that the lock has been released to the stream manager 134, which then unlocks the locked data tuples in the operator graph 132.

Generally, in a streams computing application, data attributes flow into an operator of a source PE of a stream computing application and are processed by that operator. Typically, operators receive an N-tuple of data attributes from the stream as well as emit an N-tuple of data attributes into the stream (except for operators in a sink PE where the stream terminates). In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values.

Of course, the N-tuple received by an operator need not be the same N-tuple sent downstream. Additionally, operators could be configured to receive or emit tuples in other formats (e.g., the PEs or operators could exchange data marked up as XML documents). Furthermore, each operator within a PE may be configured to carry out any form of data processing functions on the received tuple, including, for example, writing to database tables in the DBMS 110 or performing other database operations such as data joins, splits, reads, etc., as well as performing other data analytic functions or operations.

The stream manager 134 may be configured to monitor the stream computing application running on the compute nodes $130_{1-4}$, as well as to change the deployment of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements and operators) running on the compute nodes $130_{1-4}$. One example of a stream computing application is IBM®'s InfoSphere® Streams (InfoSphere® is a trademark of International Business Machines Corporation, registered in many jurisdictions worldwide).

Further, the stream manager 134 may receive an indication of locked data from the lock manager 112 and lock data tuples in the operator graph 132 based on the received lock. Similarly, the stream manager 134 may unlock locked data tuples upon receiving an indication that the lock has been released from the lock manager 112. Further still, the stream manager 134 may determine that data tuples have been locked in the operator graph 132, and transmit an indication of the locked data tuples to the lock manager 112. In response, the lock manager 112 may lock corresponding data elements in the DBMS 110. Similarly, when the stream manager 134 determines that the lock has been released from the data tuples, the stream manager communicates an indication that the lock has been released to the lock manager 112. As such, the lock manager 112 may then unlock the locked data elements in the DBMS 110.

Figure 1B:
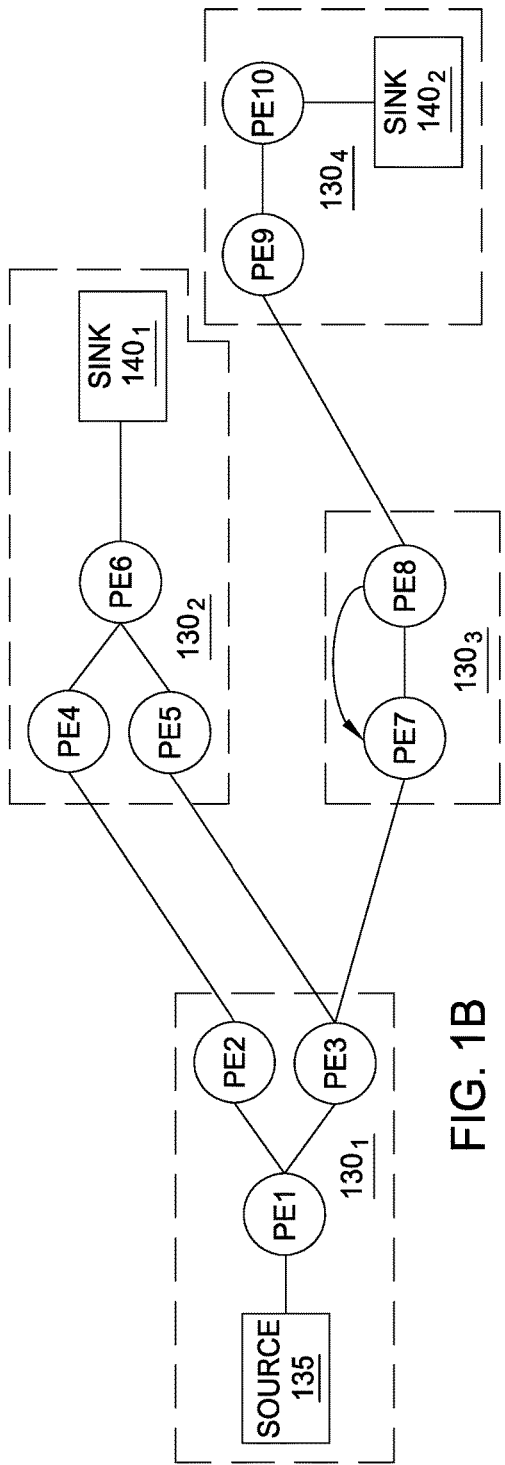

FIG. 1B illustrates an example processing element graph that includes ten processing elements (labeled as PE1-PE10) running on the compute nodes $130_{1-4}$. A processing element is composed of one or more operators fused (or combined) together into an independently running process with its own process ID (PID) and memory space. Inter-process communication between two or more processing elements may occur using a "transport" (e.g., a network socket, a TCP/IP socket, or shared memory). However, when operators are fused together, the fused operators can use other more rapid communication techniques for passing tuples among operators in each processing element.

As shown, the processing element graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into operators in the processing element PE1, which in turn emits tuples that are received by PE2 and PE3. For example, operators in PE1 may split data attributes received in a tuple and pass some data attributes to PE2, while passing other data attributes to PE3. Data that flows to PE2 is processed by the operators contained in PE2, and the resulting tuples are then emitted to the operators in PE4 on compute node $130_2$. Likewise, the data tuples emitted by the operators in PE4 flow to the operators sink PE6 $140_1$. Similarly, data tuples flowing from operators in PE3 to operators in PE5 also reach operators in sink PE6 140$_1$. Thus, in addition to being a sink for this example processing element graph, operators in PE6 could be configured to perform a join operation, combining tuples received from operators in PE4 and PE5. This example processing element graph also shows data tuples flowing from PE3 to PE7 on compute node 130$_3$, which itself shows data tuples flowing to operators in PE8 and looping back to operators in PE7. Data tuples emitted from operators in PE8 flow to operators in PE9 on compute node 130$_4$, which in turn emits tuples to be processed by operators in sink PE10 140$_2$.

Because a processing element is a collection of fused operators, it is equally correct to describe the operator graph as data flow paths between specific operators, which may include data flow paths to different operators within the same processing element.

Figure 2:
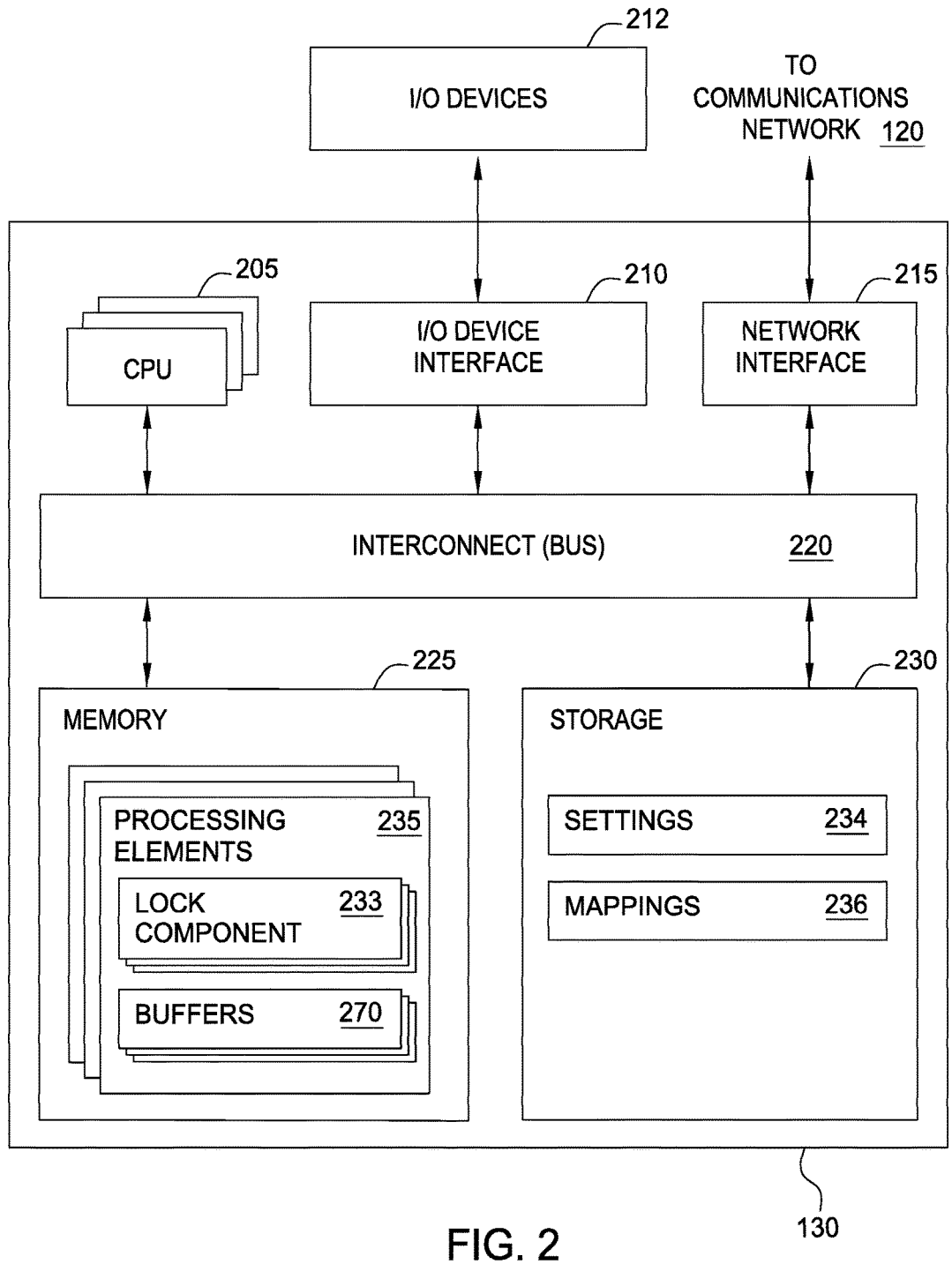
FIG. 2 is a more detailed view of the compute nodes of the streams computing application of FIGS. 1A-1B, according to one embodiment.

FIG. 2 is a more detailed view of the compute node 130 of the streams computing application of FIGS. 1A-1B, according to one embodiment. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators that are fused together. As noted above, each operator may provide a small chunk of code configured to process data flowing into a processing element (e.g., PE 235) and to emit data to other operators in the same PE or to other PEs in the stream computing application. Such processing elements may be on the same compute node 130 or on other compute nodes that are accessible via communications network 120.

As shown, the operators include a lock component 233. The lock component 233 is configured to manage locking of data tuples and implement cooperative data locking between the streams computing application and the DBMS 110. For example, the lock component 233 may receive an indication that data in the DBMS 110 has been locked. The lock component 233 may then lock data tuples in the associated operator based on the settings 234 and mappings 236. For example, if the DBMS 110 locks all records in the database having a last name value of "Smith," the lock component 233 identifies data tuples entering and/or exiting the operator that have a last name value of "Smith", and locks these tuples. Once the lock in the DBMS 110 has been released, the lock component 233 then releases the lock on the locked data tuples. As another example, the lock component 233 of a given operator may determine that a given data tuple will cause changes in the database of the DBMS 110. Therefore, the lock component 233 may transmit an indication to the DMBS 110 to lock the corresponding database data in the DBMS 110. More generally, the lock component 233 communicates information related to locking and unlocking data tuples to the DBMS 110.

As shown, the memory 225 further includes one or more buffers 270. The buffers 270 are generally configured to store data tuples that are being stored for subsequent processing by one or more operators and/or PEs 235. Furthermore, the buffers 270 may store locked data tuples until the locks for the data tuples have been released. Doing so allows the operators and/or PEs 235 to process other, unlocked data tuples, rather than waiting for the locks to be released.

As shown, the storage 230 includes a data store of settings 234 and a data store of mappings 236. The settings 234 store parameters used to implement cooperative locking with the DBMS 110. Generally, the settings 234 specify whether and how the PEs 235 and/or operators implement locking of data tuples. Furthermore, for a given operator, the settings 234 also specify whether the associated lock component 233 should apply the lock to one or more of the operator level (e.g., an operator is locked), a tuple level (e.g., all tuples including a particular attribute are locked), and/or an attribute level (e.g., all tuples having a particular attribute value are locked). In addition, in at least one embodiment, the settings 234 may specify whether the lock component 233 should lock an entire tuple, or lock one or more attribute fields of a tuple (e.g., locking an employee role attribute while not locking the employee phone number attribute).

The settings 234 further specify how a given operator manages locked data. For example, if an operator receives a locked data tuple, the settings 234 of the operator may specify to wait for the lock to be released before processing the locked data tuple and any other data tuples. As another example, the settings 234 may specify that the lock component 233 of the operator place the locked data tuple in a queue (e.g., a buffer 270) until the lock is released, allowing the operator to process data tuples while waiting for the lock to be released. As yet another example, the settings 234 may permit an operator to process a data tuple, but do not allow the operator to modify any attribute values of the data tuple.

The settings 234 may further specify lock timeout values, which control the duration of an associated lock. For example, a default lock timeout value may be 1 second, where the default duration of a lock is 1 second. If the lock is not released within 1 second, the lock component 233 may release the lock based on the expiration of the default lock timeout value. However, the duration of a given lock may be based on other factors. For example, the lock duration may be based on one or more of the rate of tuple flow in the operator graph 132, a predefined number of operators that a tuple can travel through before the lock is released (e.g., release the lock once a locked tuple has traveled through 4 operators), and the like.

The mappings 236 store mappings between one or more database elements (e.g., a database, table, column, row, etc.) and one or more elements of the streams computing application (e.g., tuple attributes, tuple attribute values, operators, PEs 235, and the like). For example, an entry in the mappings 236 may associate a "customer_ID" column in a "customer" table in a database managed by the DBMS 110 to a "cust_ID" tuple attribute in the streams computing application. Therefore, if the DBMS 110 locks the "customer_ID" column of the customer table, the stream manager 134 may receive an indication of the lock, and transmit the indication to the lock component 233 of the operators, which may then lock any tuples having the "cust_ID" attribute in the based on the mappings 236.

Furthermore, the mappings 236 may specify which operators and/or data tuples will ultimately be stored in a database of the DBMS 110. For example, an operator may be programmed process temperature values in data tuples. However, the temperature readings may ultimately be stored in the DBMS 110, and an "average temperature" value in the DBMS may be modified based on the temperature values in the data tuples. As such, if the sensor taking temperature readings provides data tuples to the operator, it may be advantageous to lock the "average temperature" value in the DBMS 110. Therefore, the mappings 236 may associate the operator that process the data tuples with temperature data and/or the data tuples with temperature data with the "average temperature" record in the DBMS 110. As such, the lock component 233 may transmit an indication to lock the "average temperature" record in the DBMS 110 when the associated operator begins processing the data tuples that include temperature data.

Furthermore, the data tuples may be locked based on a key value from the DBMS 110. For example, an administrator may need to update data for a customer in the DBMS 110, where the cust_ID value for the customer is "10133". Therefore, the lock component 233 may lock all tuples having a customer_ID attribute value of "10133". As another example, the lock component 233 may lock data tuples based on a partial key value from the DBMS 110. For example, the partial key value for locking the cust_ID column may be "101". As such, the lock component 233 of an operator may lock all data tuples having a customer_ID attribute value which begins with "101", such as "10133", "10101", and the like.

Figure 3:
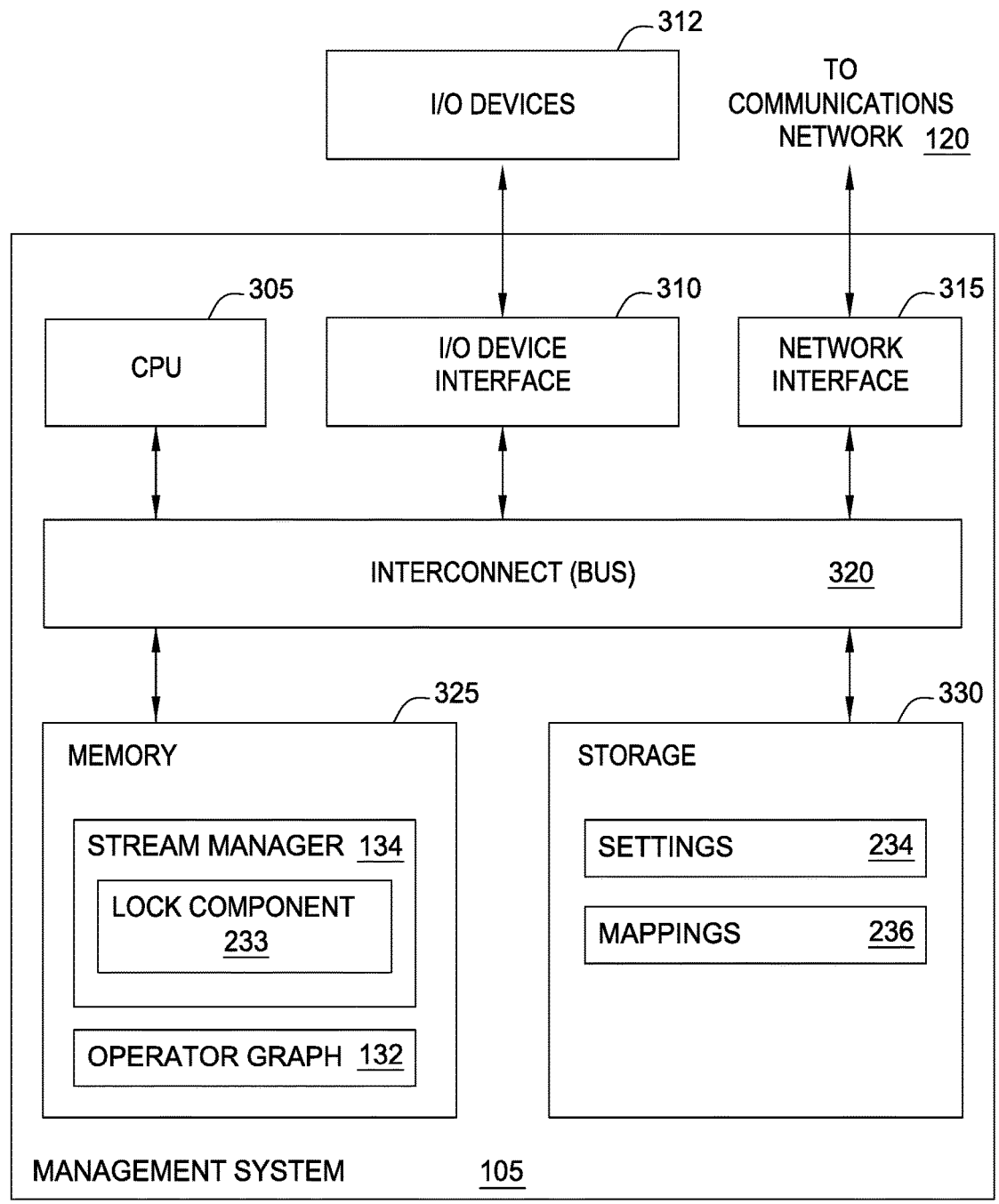
FIG. 3 is a more detailed view of the server management system of the streams computing application of FIGS. 1A-1B, according to one embodiment.

FIG. 3 is a more detailed view of the server management system 105 of the streams computing application of FIGS. 1A-1B, according to one embodiment. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 includes the stream manager 134 and the operator graph 132. The stream manager 134 may use the operator graph 132 to route tuples to PEs 235 for processing. The stream manager 134 also includes an instance of the lock component 233, which, as described above, is configured to communicate with the DBMS 110 to implement cooperative locking. Generally, the instance of the lock component 233 of the stream manager 134 receives indications of locked and unlocked data in the DBMS 110, and transmits indications of locked and unlocked data in the operator graph 132. Furthermore, the lock component 233 is configured to lock and/or unlock data tuples in transit in the operator graph 132.

As shown, the storage 330 includes instances of the settings 234 and mappings 236, described in greater detail above. Generally, the instances of the settings 234 and mappings 236 in the storage 330 aggregate all of the settings 234 and mappings 236 from the storage 230 of the compute nodes 130. For example, doing so allows the instance of the lock component 233 to determine whether to transmit an indication of a lock event received from the DBMS 110 to the lock component 233 of a given operator.

Figure 4:
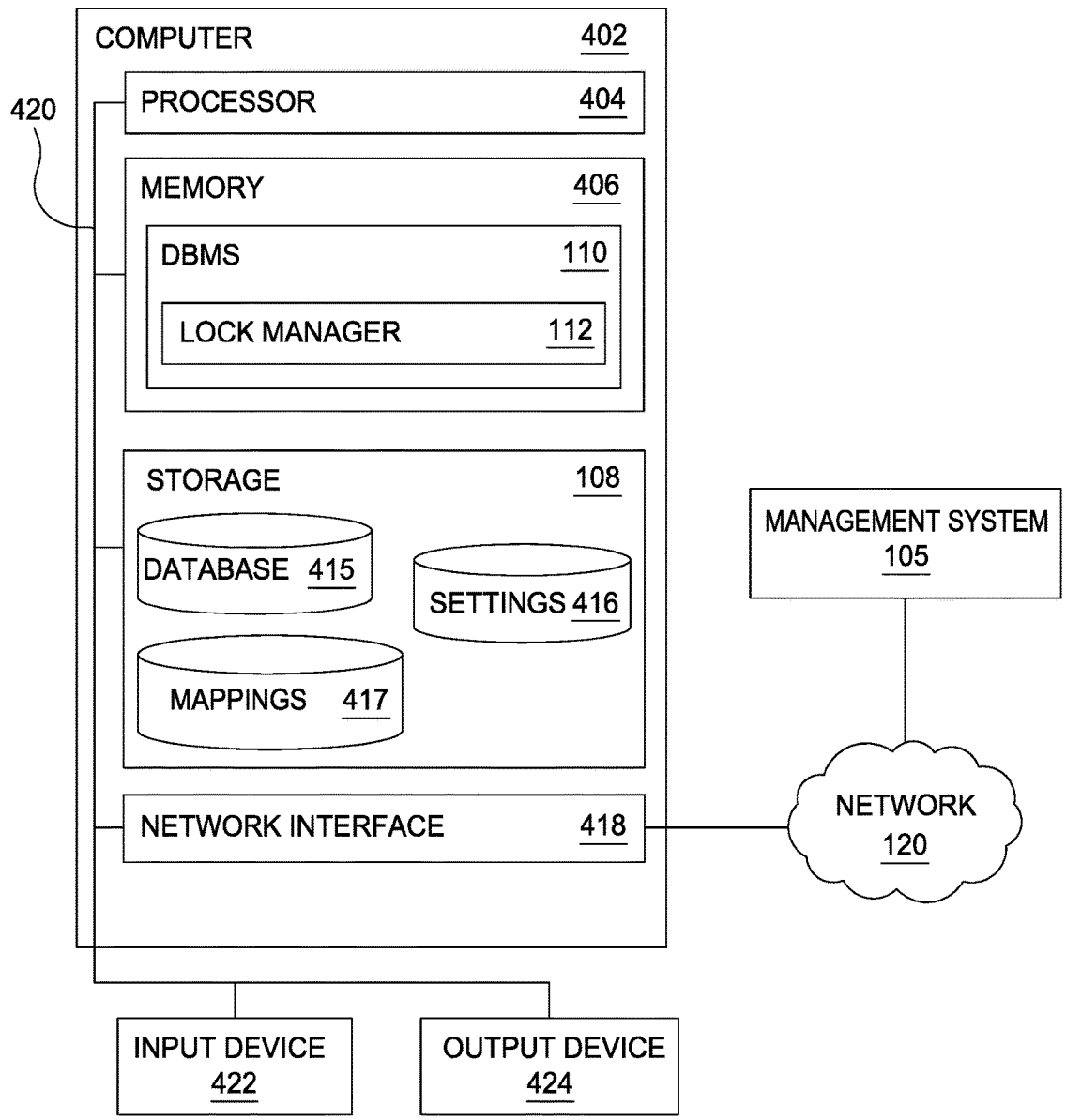
FIG. 4 depicts a computing system including the database management system of FIG. 1A, according to one embodiment.

FIG. 4 depicts a computing system 400 including the database management system 110 of FIG. 1A, according to one embodiment. The networked system 400 includes a computer 402. The computer 402 may also be connected to other computers (e.g., the management system 105) via the network 120.

The computer 402 generally includes a processor 404 which obtains instructions and data via a bus 420 from a memory 406 and/or a storage 408. The computer 402 may also include one or more network interface devices 418, input devices 422, and output devices 424 connected to the bus 420. The computer 402 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is a programmable logic device that performs instruction, logic, and mathematical processing, and may be representative of one or more CPUs. The network interface device 418 may be any type of network communications device allowing the computer 402 to communicate with other computers via the network 430.

The storage 408 is representative of hard-disk drives, solid state drives, flash memory devices, optical media and the like. Generally, the storage 408 stores application programs and data for use by the computer 402. In addition, the memory 406 and the storage 408 may be considered to include memory physically located elsewhere; for example, on another computer coupled to the computer 402 via the bus 420.

The input device 422 may be any device for providing input to the computer 402. For example, a keyboard and/or a mouse may be used. The input device 422 represents a wide variety of input devices, including keyboards, mice, controllers, and so on. Furthermore, the input device 422 may include a set of buttons, switches or other physical device mechanisms for controlling the computer 402. The output device 424 may include output devices such as monitors, touch screen displays, and so on.

As shown, the memory 406 contains the DBMS 110, which further includes the lock manager 112. As shown, the storage 408 contains one or more databases 415, a data store of settings 416, and a data store of mappings 417. In at least one embodiment, the database 415 is a relational database, however, the disclosure is applicable to other types of databases. Similar to the settings 234, the settings 416 specify settings used by the lock manager 112 to implement cooperative locking with the streams computing application. Additionally, the mappings 417 map data tuples, data tuple attributes, operators, and/or PEs 235 to one or more databases 415 and/or a component thereof. For example, the mappings 417 may map an operator 140 to an employee table in a database 415, while mapping an attribute of a data tuple (e.g., "emp_ID") to a column of the employee table which stores employee IDs.

More generally, the lock manager 112 transmits, to the lock component 233 of the stream manager 134, an indication of lock events and unlock events that are applied to the database 415. Doing so allows the lock component 233 to lock data tuples and/or operators 140 accordingly. Similarly, the lock manager 112 is configured to receive indications of lock and unlock events from the lock component 233 of the stream manager 134. Doing so allows the lock manager 112 to lock and/or unlock matching and/or mapped data in the database 415 accordingly.

The settings 416 further specify lock timeout values which limit the duration of a lock applied by the lock manager 112 to the database 415. In addition to default timeout values, the settings 416 may include timeout values that are based on the type of lock applied by the lock manager 112 (e.g., a record lock, a column lock, or a table lock). The timeout values in the settings 416 may also be based on the type of commitment control applied by the lock manager 112 (e.g., how changes are committed to the database 415).

Figure 5A:
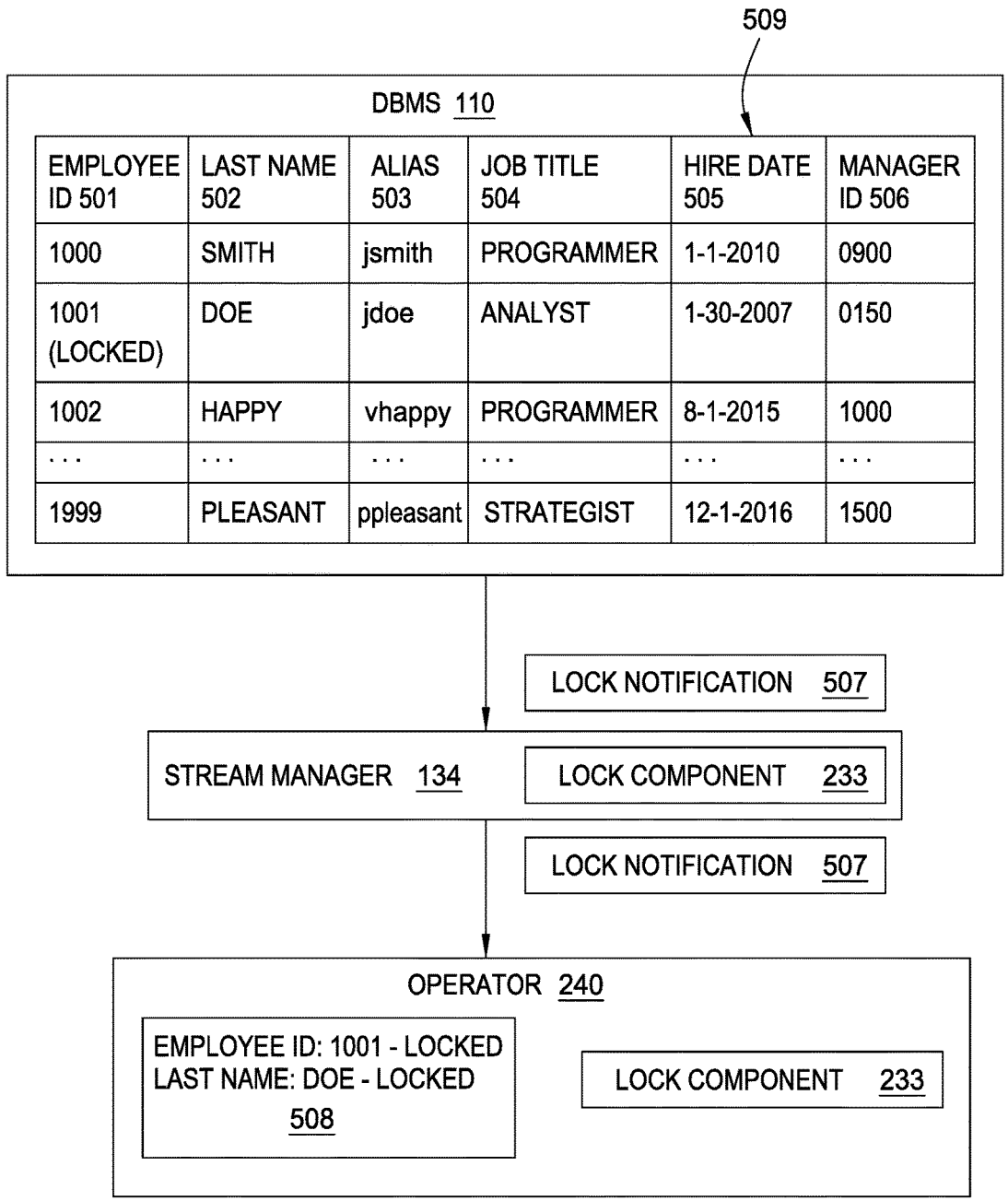
FIGS. 5A-5D depicts example cooperative data locking techniques between databases that are integrated with distributed computing applications, according to one embodiment.

FIG. 5A is a schematic 500 depicting example cooperative data locking techniques between databases that are integrated with distributed computing applications, according to one embodiment. As shown, the schematic 500 depicts an example table 509 of a database 415 in the DBMS 110. As shown, the table 509 includes example information for employees in an organization. In the example depicted in FIG. 5A, the employee table 509 includes an employee ID column 501, a last name column 502, an alias column 503, a job title column 504, a hire date 505, and a manager ID 506. As shown, the lock manager 112 has applied a lock to the employee ID 501 having a value of "1001". As such, the lock manager 112 illustratively sends a lock notification 507 to the stream manager 134. The notification 507 includes data describing the lock applied to the employee ID value of 1001. For example, the notification 507 may specify that the entire row of data for the employee having the ID value of 1001 is locked, or that the employee ID field 501 has been locked for the employee having the ID value of 1001.

Once received, the lock component 233 of the stream manager 134 analyzes the lock notification 507 based on the settings 234 and/or mappings 236 to identify whether any data tuples in the operator graph 132 should be locked, and whether any operators 140 are associated with a lock of the employee ID field of the table 509. Illustratively, as shown, the lock notification 507 is forwarded by the stream manager 134 to an example operator. In response, the lock component 233 has locked an example data tuple 508 having an employee ID value of 1001, which matches the locked employee ID in the table 509. Based on the matching values (e.g., "1001"), the lock component 233 locks at least the employee ID attribute value of the data tuple 508. As previously indicated, the settings 234 of the operator specify whether the operator waits for the lock to be released before processing the tuple 508 (and/or any other data tuples), whether the locked tuple 508 is placed in a buffer 270 until the lock is released, or whether the operator processes the tuple 508, but does not change any of the attribute values of the tuple 508.

Figure 5B:
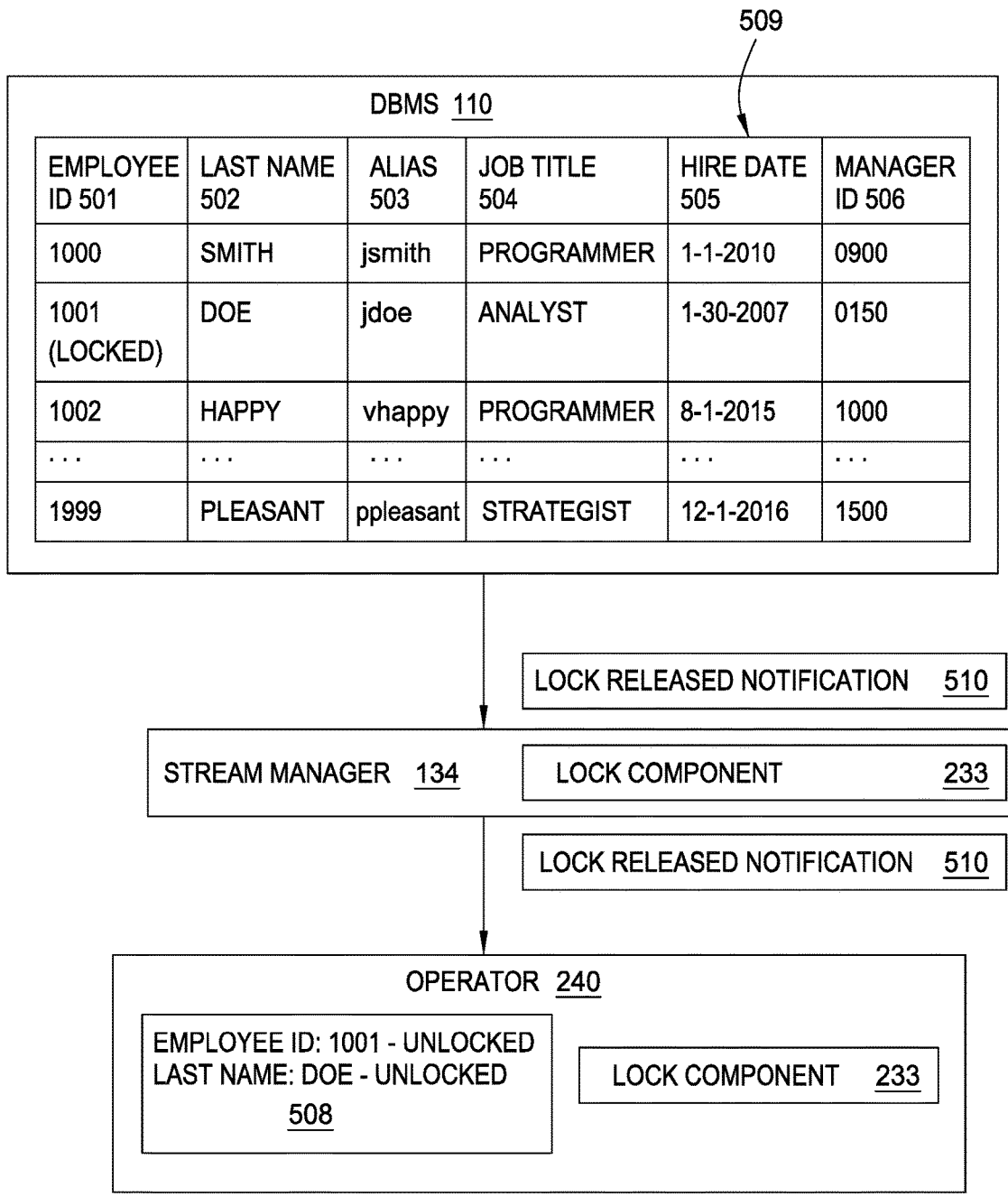

FIG. 5B depicts an embodiment where the lock manager 112 of the DBMS 110 has released the lock on the employee ID of 1001. As shown, the lock manager 112 generates and sends a lock released notification 510 to lock component 233 of the streams manager 134, where the notification 510 includes data indicating that the lock on the employee ID value of 1001 has been released. In response, the lock component 233 forwards the notification 510 to the lock component 233 of the operator, which releases the lock on the data tuple 508, as the employee ID attribute value of tuple 508 matches the employee ID value that was locked in the DBMS 110.

Figure 5C:
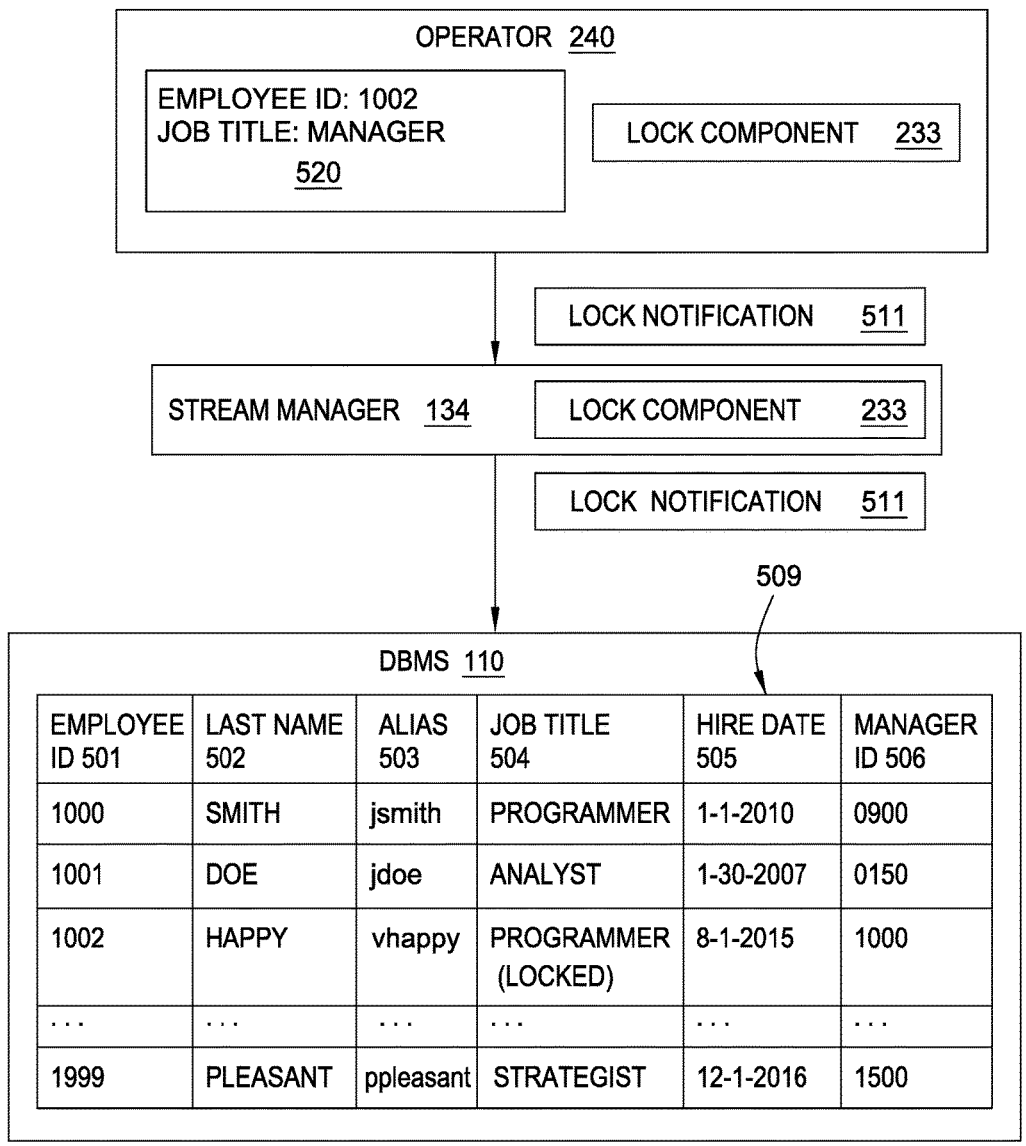

FIG. 5C depicts an embodiment where the lock component 233 of the operator generates and transmits a lock notification 511. As shown, a data tuple 520 specifies an employee ID attribute value of 1002 and a job title of "manager". However, as reflected in the database table 509, the job title 504 of the employee having the ID of 1002 is "analyst". Assuming the operator is updating the job title in the data tuple 520 because the employee has been promoted to a new role, the lock component 233 determines that the corresponding job title 504 in the table 509 will be modified, and should be locked. Therefore, the lock component 233 generates the lock notification 511, which specifies at least the employee ID of 1002 and the job title field. The lock component 233 of the stream manager 134 then forwards the lock notification 511 to the DBMS 110, where the lock manager 112 applies a lock to the job title 504 of the employee having an employee ID of 1002, as the employee ID 1002 matches the employee ID in the notification 511. As previously stated, the lock manager 112 may apply the settings 416 and/or mappings 417 to apply the lock to the job title 504.

Figure 5D:
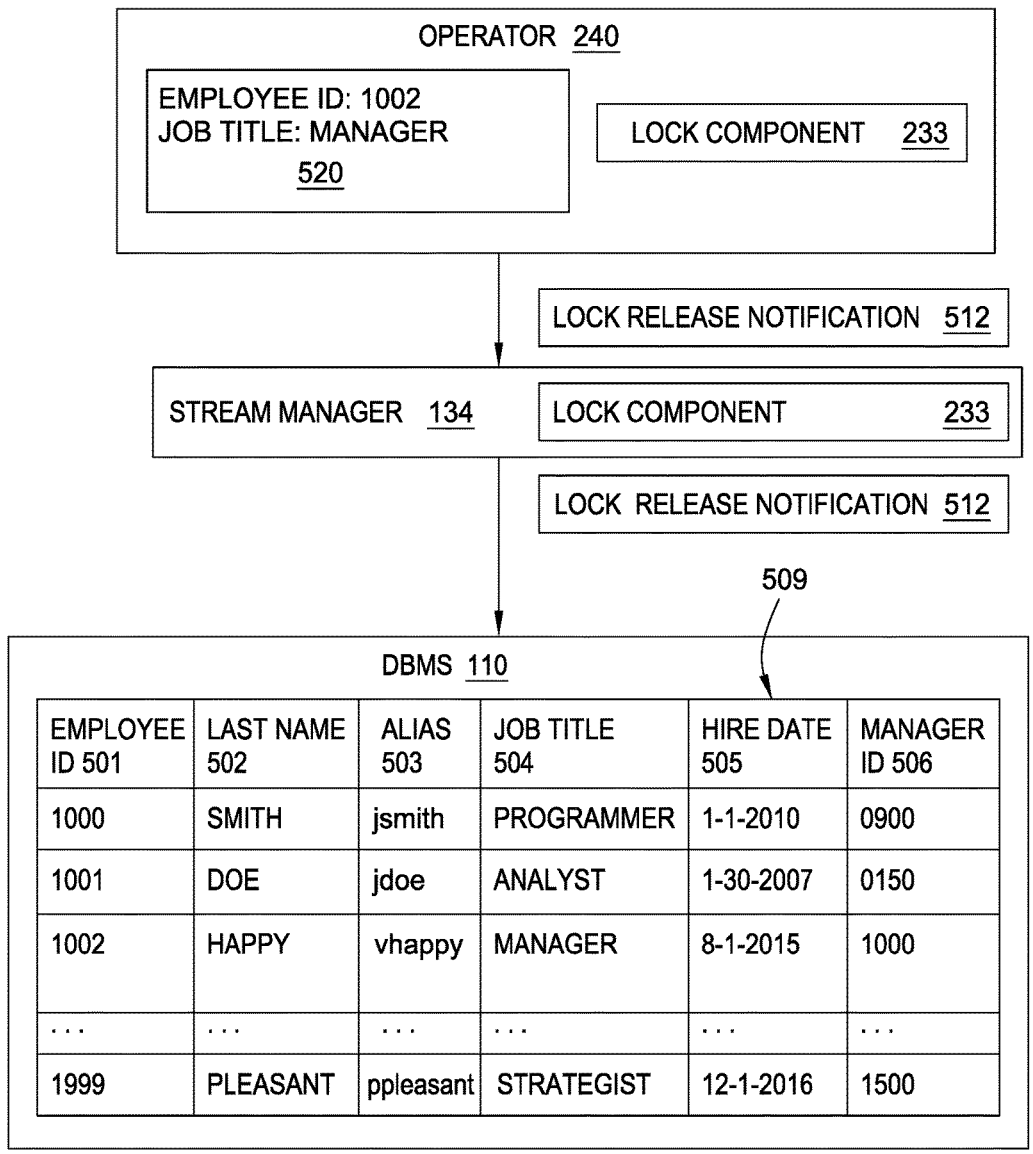

FIG. 5D illustrates an embodiment where the lock component 233 of the operator has transmitted a lock release notification 512 indicating the DBMS 110 can release the lock on the job title 504 of the employee having the employee ID of 1002. Once received, the lock manager 112 of the DBMS 110 releases the lock. As shown, the job title 504 may then subsequently be updated with the new job title of "manager" that was defined in the tuple 520.

Figure 6:
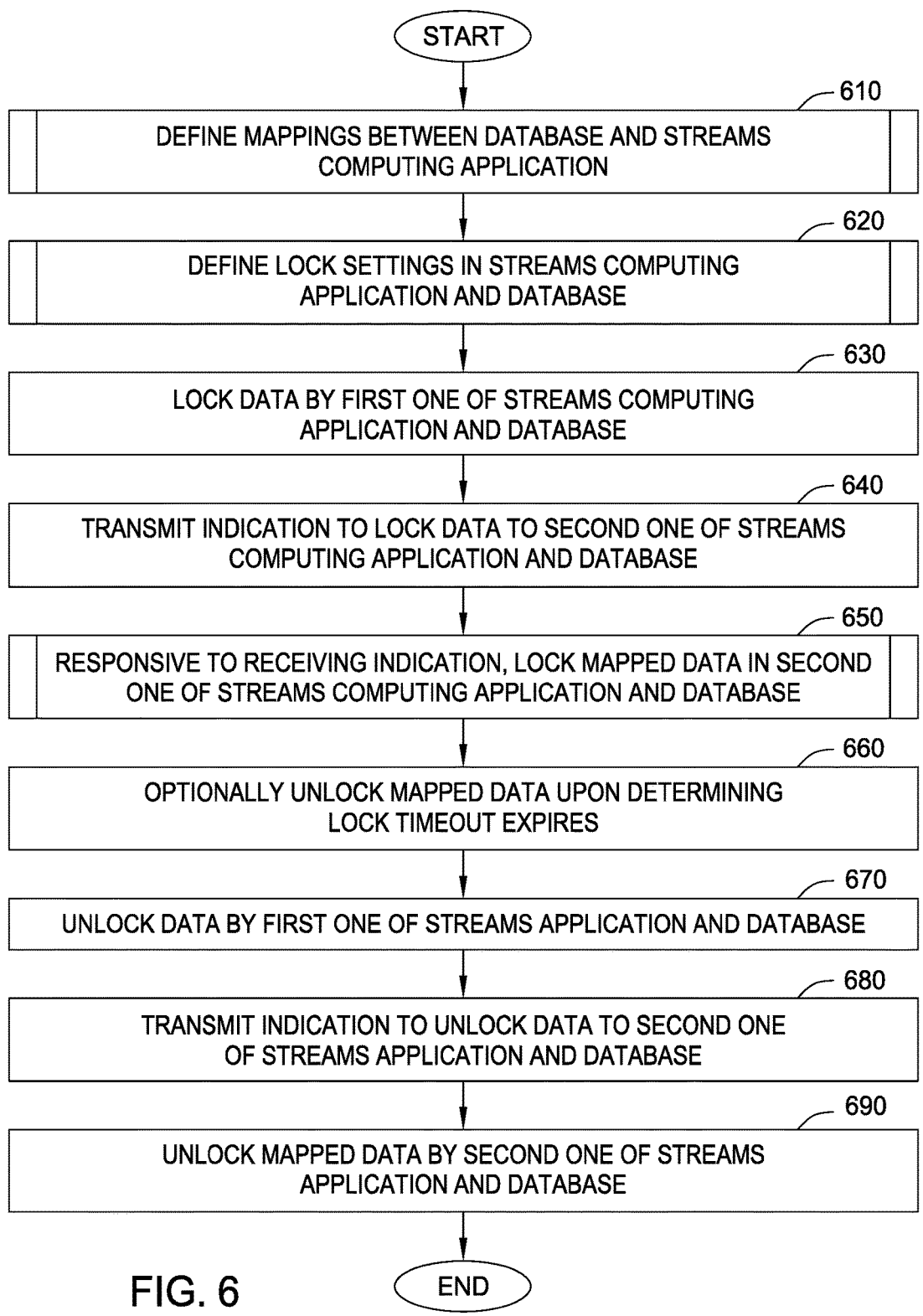
FIG. 6 is a flow chart illustrating an example method to provide cooperative data locking between databases that are integrated with streams computing applications, according to one embodiment.

FIG. 6 is a flow chart illustrating an example method 60 to provide cooperative data locking between databases that are integrated with streams computing applications, according to one embodiment. As shown, the method 600 begins at block 610, described in greater detail with reference to FIG. 7, where mappings between the database 415 of the DBMS 110 and the streams computing application are defined. The mappings are stored as the mappings 416 in the DBMS 110, and as the mappings 236 in the storage 230 and/or 330 in the streams computing environment. For example, an operator may modify data tuples whose attribute values are ultimately stored in a product table of the database 415. As such, the mappings 416 may map the operator to the entire product table, a column of the product table, or one or more records in the product table. Similarly, the mappings 236 may map the columns of the product table to the attributes of data tuples.

At block 620, described in greater detail with reference to FIG. 8, the settings 234 in the streams computing environment and the settings 417 in the DBMS 110 are defined. Generally, the settings 234 identify which operators are subject to locking and how the subject operators implement locking, including any applicable lock timeout values. In the DBMS 110, the settings 417 similarly include lock timeout values, commitment controls employed, lock types, and the like.

At block 630, a first one of the lock manager 112 and/or the lock component 233 locks data. For example, the lock manager 112 may lock data in the database 415, and/or the lock component 233 locks data tuples in the streams computing application. However, in one embodiment, the lock component 233, without actually locking data tuples, determines that one or more data tuples in the streams computing application will modify data in the database 415. For example, the lock manager 112 may lock a first column of a first table of the database 415 while a backup operation saves the first column to a remote data store. As another example, the lock component 233 may identify, based on the mappings 236, that an operator will modify a group of records in the database 415.

At block 640, the first one of the lock manager 112 and/or the lock component 233 transmits an indication to the second one of the lock manager 112 and/or the lock component 233, where the indication specifies that data should be locked in the database 415 and/or the streams computing application, respectively. For example, the lock manager 112 may transmit an indication that the first column of the first table has been locked to the lock component 233 of the stream manager 134. Similarly, the lock component 233 of the stream manager 134 may transmit, to the lock manager 112, an indication that an operator mapped to a particular element of the database 415 is processing data tuples that are likely to modify the database 415.

At block 650, described in greater detail with reference to FIG. 9, mapped data in the second one of the database 415 and the streams computing application is locked responsive to receiving the indication sent at block 640. For example, the lock manager 112 may lock the element of the database 415 that is likely to be modified by the data tuples being processed by the operator. As another example, the lock component 233 may lock all tuple attributes that are mapped to the first column of the first table of the database 415. If, for example, a particular key value (or partial key value) from the first column of the first table is locked, the lock component 233 locks all data tuples having mapped attributes whose values match the key value (or partial key value).

At block 660, the mapped data locked at block 650 is optionally unlocked upon determining that a timeout of the lock expires. At block 670, the data locked at block 630 is released. In embodiments where the lock component 233 does not actually lock data tuples in the streams computing application, the lock component 233 may instead determine that processing of the relevant data tuples (or by the relevant operators) has been completed. Therefore, at block 680, an indication specifying to release the lock is sent to the second one of the lock manager 112 and/or the lock component 233. At block 690, the lock manager 112 and/or the lock component 233 unlocks the mapped data that was locked at block 650.

Figure 7:
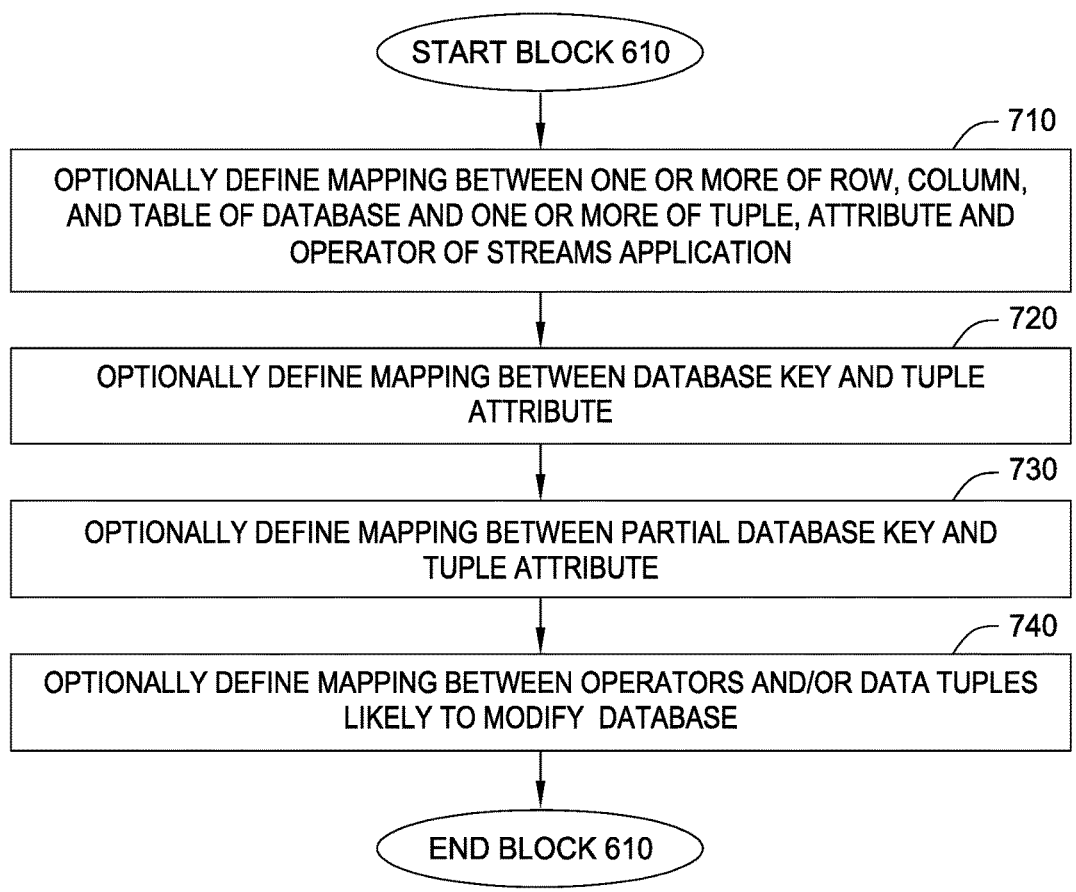
FIG. 7 is a flow chart illustrating an example method to define mappings between databases and streams computing applications, according to one embodiment.

FIG. 7 is a flow chart illustrating an example method 700 corresponding to block 610 to define mappings between databases and streams computing applications, according to one embodiment. Generally, the steps of the method 700 define mappings between the databases 415 of the DBMS 110 and the streams computing application (and vice versa) to facilitate cooperative locking techniques. As shown, the method 700 begins at block 710, where mappings between one or more of a row, column, table, and/or database 415 and one or more of a tuple, attribute, and/or operator of the streams computing application are defined. At block 720, mappings between a complete database key and a data tuple attribute are defined. At block 730, mappings between a partial database key and a data tuple attribute are defined. At block 740, mappings between operators and/or data tuples that are likely to modify data in the database 415 are defined.

Figure 8:
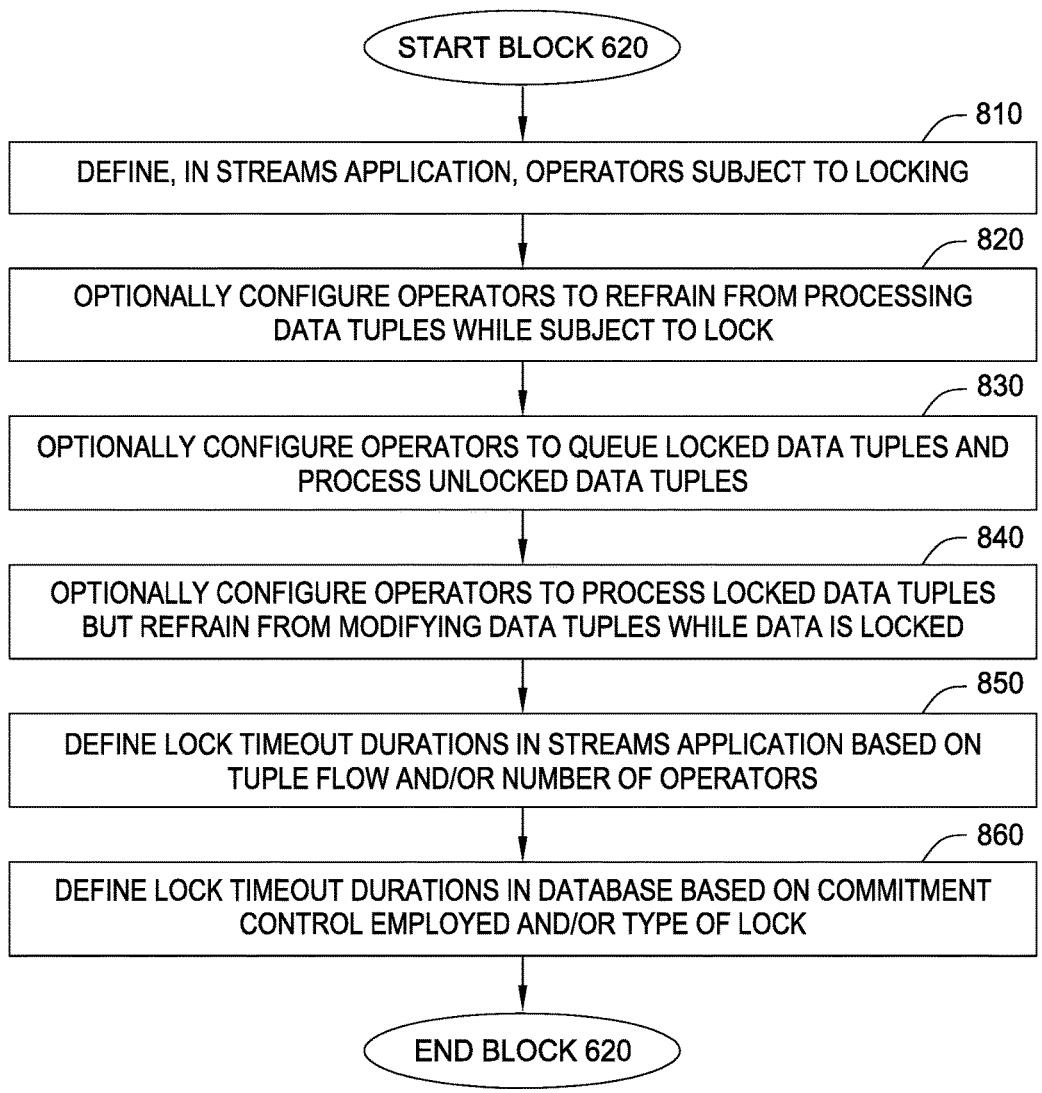
FIG. 8 is a flow chart illustrating an example method to define lock settings, according to one embodiment.

FIG. 8 is a flow chart illustrating an example method 800 corresponding to block 620 to define lock settings, according to one embodiment. As shown, the method 800 begins at block 810, where operators in the streams application that are subject to locking are defined. For example, if the streams application has 100 operators, a programmer may define a subset of 10 operators as being subject to cooperative locking with the DBMS. The settings 234 of each operator (and the management system 105) then reflect which operators are subject to cooperative locking. At block 820, one or more operators are optionally configured to refrain from processing any data tuples while a lock is currently applied to a data tuple in the operator, or applied to the operator itself. At block 830, one or more operators are optionally configured to queue locked data tuples in a buffer 270 for locked data tuples.

At block 840, one or more operators are optionally configured to process locked data tuples but to refrain from modifying attribute values of the data tuples while subject to the lock. At block 850, lock timeout durations are defined for the streams computing application. Generally, the durations may be based on an amount of tuple flow and/or a number of operators that a locked data tuple can flow through before the lock times out. For example, a first lock timeout value may apply when the data tuple flow in the operator graph 132 is less than 1,000,000 tuples per minute, while a second lock timeout value, greater than the first lock timeout value, applies when the data tuple flow in the operator graph 132 is greater than 1,000,000 tuples per minute. As another example, a lock may be automatically released when a locked data tuple passes through 5 operators. At block 860, lock timeouts in the DBMS 110 are defined based on the commitment control employed by the DBMS 110 and/or the type of lock applied by the lock manager 112. For example, a first timeout threshold value may apply to record locks, while a second timeout threshold value may apply to column locks, and a third timeout threshold value may apply to table locks. Generally, whenever a timeout parameter is exceeded (e.g., time, tuple flow, or operator count), the lock manager 112 and/or the lock component 233 release the lock without requiring receipt of an indication to do so.

Figure 9:
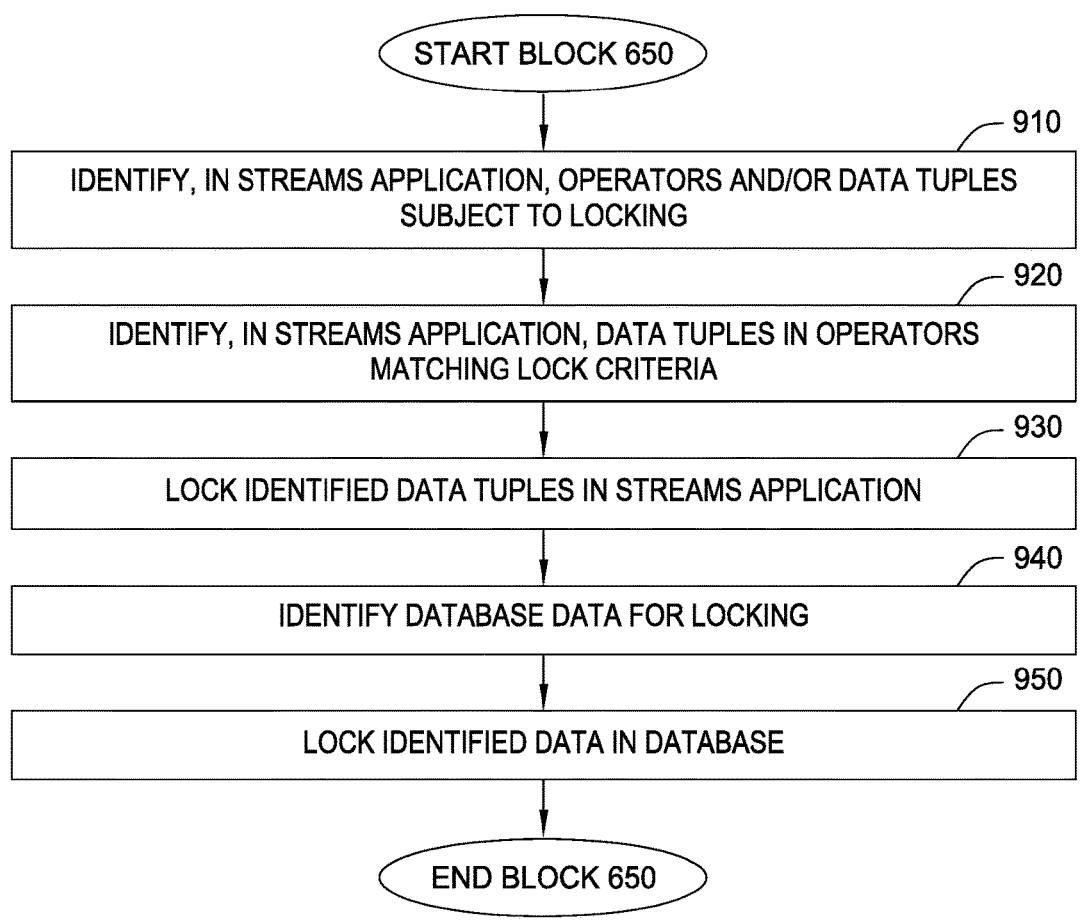
FIG. 9 is a flow chart illustrating an example method to lock mapped data, according to one embodiment.

FIG. 9 is a flow chart illustrating an example method 900 corresponding to block 650 to lock mapped data, according to one embodiment. As shown, the method 900 begins at block 910, where the lock component 233 of the stream manager 134 identifies operators and/or data tuples flowing in the operator graph 132 that are subject to locking. Generally, to identify data tuples flowing in the operator graph that are subject to locking, the lock component 233 identifies data tuples whose attribute values match some specified criteria from the DBMS. For example, if the user ID of "anon" is locked in the database 415, the lock component 233 of the stream manager 134 searches for tuples specifying the user ID "anon" in the operator graph 132. To identify operators that are subject to locking, the lock component 233 of the stream manager 134 references the settings 134. Once identified, the lock component 233 of the stream manager 134 provides an indication of all applicable lock criteria to the instance of the lock component 233 on each identified operator. Doing so allows the instances of the lock component 233 in the operators to identify data tuples having operators matching the lock criteria at block 920. In at least one embodiment, the lock component 233 of the operators analyze tuples at the entry and exit points of each operator (e.g., input/output buffers 270). If the attribute values of the tuples entering or leaving the operator match the lock criteria, the lock component 233 locks the data tuple based on the settings 234 for the operator at block 930.

At block 940, the lock manager 112 identifies data in the database 415 that should be locked based on an indication received from the lock component 233. For example, the lock manager 112 may identify the data in the database 415 based on the mappings 417 which maps an operator, data tuple attribute, and/or data tuple attribute value to record(s), column(s), and/or table(s) of the database 415. In at least one embodiment, the lock manager 112 further identifies data in the database 415 having values matching attribute values optionally specified in a notification received from the lock components 233 (e.g., matching key and/or partial key values). At block 950, the lock manager 112 locks the data identified at block 940.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    defining one or more mappings between database elements in a database management system (DBMS) and data tuples in an operator graph of a distributed application, wherein the operator graph comprises one or more operators configured to process data tuples;
    locking, by a first one of the DBMS and the distributed application, one of a first database element in the DBMS and a first data tuple in the operator graph of the distributed application;
    transmitting an indication of the locking by the first one of the DBMS and the distributed application to a second one of the DBMS and the distributed application;
    identifying, by the second one of the DBMS and the distributed application, based on the defined one or more mappings, one of a second database element and a second data tuple corresponding to the one of the first database element and the first data tuple; and
    locking, by the second one of the DBMS and the distributed application, the identified one of the second database element and the second data tuple.

2. The method of claim 1, wherein the first one of the DBMS and the distributed application comprises the DBMS, wherein the first database element comprises one or more of: (i) a database, (ii) a database table, (iii) a database record, and (iv) a database column, wherein the second data tuple is identified by matching a value of the first database element to an attribute value of the second data tuple, wherein the first database element is mapped to the attribute of the second data tuple.

3. The method of claim 2, wherein the first database element is further mapped to one or more of: (i) at least a first operator of the operator graph of the distributed application, and (ii) the attribute of the second data tuple, wherein locking the second data tuple comprises at least one of: (i) refraining from processing any data tuples by the first operator, (ii) placing the second data tuple in a buffer for locked data tuples and processing a third data tuple by the first operator, and (iii) processing the second data tuple by the first operator without changing any attribute values of the second data tuple.

4. The method of claim 3, wherein the value of the first database element comprises a database key, wherein one of: (i) the database key, and (ii) a portion of the database key is matched to the attribute value of the second data tuple to identify the second data tuple.

5. The method of claim 1, wherein the first one of the DBMS and the distributed application comprises the distributed application, wherein at least one of a first operator processing the first data tuple and the first data tuple are predetermined to modify the second database element, wherein the second database element comprises one or more of: (i) a database, (ii) a database table, (iii) a database record, and (iv) a database column.

6. The method of claim 1, further comprising:
    unlocking, by the first one of the DBMS and the distributed application, the one of the first database element and the first data tuple;
    transmitting an indication of the unlocking by the first one of the DBMS and the distributed application to the second one of the DBMS and the distributed application; and
    unlocking, by the second one of the DBMS and the distributed application, the identified one of the second database element and the second data tuple.

7. The method of claim 1, wherein the identified one of the second database element and the second data tuple are unlocked upon determining a corresponding lock timeout has expired, wherein the lock timeout is based on one or more of: (i) a rate of flow of data tuples in the distributed application, (ii) a count of operators the second data tuple has traveled through, (iii) a type of lock applied to the first database element, and (iv) a type of commitment control used by the DBMS, wherein the distributed application comprises:

a plurality of processing elements comprising one or more operators, the operators configured to process data tuples, wherein the plurality of processing elements execute on at least one compute node of a plurality of compute nodes; and the operator graph of a plurality of operators, the operator graph defining at least one execution path in which a first operator of the plurality of operators is configured to: (i) receive data tuples from at least one upstream operator and (ii) transmit data tuples to at least one downstream operator.

8. A computer program product, comprising:
a computer-readable storage medium having computer readable program code embodied therewith, the computer readable program code executable by a processor to perform an operation comprising:
defining one or more mappings between database elements in a database management system (DBMS) and data tuples in an operator graph of a distributed application, wherein the operator graph comprises one or more operators configured to process data tuples;
locking, by a first one of the DBMS and the distributed application, one of a first database element in the DBMS and a first data tuple in the operator graph of the distributed application;
transmitting an indication of the locking by the first one of the DBMS and the distributed application to a second one of the DBMS and the distributed application;
identifying, by the second one of the DBMS and the distributed application, one of a second database element and a second data tuple corresponding to the one of the first database element and the first data tuple; and
locking, by the second one of the DBMS and the distributed application, the identified one of the second database element and the second data tuple.

9. The computer program product of claim 8, wherein the first one of the DBMS and the distributed application comprises the DBMS, wherein the first database element comprises one or more of: (i) a database, (ii) a database table, (iii) a database record, and (iv) a database column, wherein the second data tuple is identified by matching a value of the first database element to an attribute value of the second data tuple, wherein the first database element is mapped to the attribute of the second data tuple.

10. The computer program product of claim 9, wherein the first database element is further mapped to one or more of: (i) at least a first operator of the operator graph of the distributed application, and (ii) the attribute of the second data tuple, wherein locking the second data tuple comprises at least one of: (i) refraining from processing any data tuples by the first operator, (ii) placing the second data tuple in a buffer for locked data tuples and processing a third data tuple by the first operator, and (iii) processing the second data tuple by the first operator without changing any attribute values of the second data tuple.

11. The computer program product of claim 10, wherein the value of the first database element comprises a database key, wherein one of: (i) the database key, and (ii) a portion of the database key is matched to the attribute value of the second data tuple to identify the second data tuple.

12. The computer program product of claim 8, wherein the first one of the DBMS and the distributed application comprises the distributed application, wherein at least one of a first operator processing the first data tuple and the first data tuple are predetermined to modify the second database element, wherein the second database element comprises one or more of: (i) a database, (ii) a database table, (iii) a database record, and (iv) a database column.

13. The computer program product of claim 8, the operation further comprising:
unlocking, by the first one of the DBMS and the distributed application, the one of the first database element and the first data tuple;
transmitting an indication of the unlocking by the first one of the DBMS and the distributed application to the second one of the DBMS and the distributed application; and
unlocking, by the second one of the DBMS and the distributed application, the identified one of the second database element and the second data tuple.

14. The computer program product of claim 8, wherein the identified one of the second database element and the second data tuple are unlocked upon determining a corresponding lock timeout has expired, wherein the lock timeout is based on one or more of: (i) a rate of flow of data tuples in the distributed application, (ii) a count of operators the second data tuple has traveled through, (iii) a type of lock applied to the first database element, and (iv) a type of commitment control used by the DBMS, wherein the distributed application comprises:
a plurality of processing elements comprising one or more operators, the operators configured to process data tuples, wherein the plurality of processing elements execute on at least one compute node of a plurality of compute nodes; and
the operator graph of a plurality of operators, the operator graph defining at least one execution path in which a first operator of the plurality of operators is configured to: (i) receive data tuples from at least one upstream operator and (ii) transmit data tuples to at least one downstream operator.

15. A system, comprising:
a processor; and
a memory storing one or more instructions which, when executed by the processor, performs an operation comprising:
defining one or more mappings between database elements in a database management system (DBMS) and data tuples in an operator graph of a distributed application, wherein the operator graph comprises one or more operators configured to process data tuples;
locking, by a first one of the DBMS and the distributed application, one of a first database element in the DBMS and a first data tuple in the operator graph of the distributed application;
transmitting an indication of the locking by the first one of the DBMS and the distributed application to a second one of the DBMS and the distributed application;
identifying, by the second one of the DBMS and the distributed application, one of a second database element and a second data tuple corresponding to the one of the first database element and the first data tuple; and
locking, by the second one of the DBMS and the distributed application, the identified one of the second database element and the second data tuple.

16. The system of claim 15, wherein the first one of the DBMS and the distributed application comprises the DBMS, wherein the first database element comprises one or more of:

(i) a database, (ii) a database table, (iii) a database record, and (iv) a database column, wherein the second data tuple is identified by matching a value of the first database element to an attribute value of the second data tuple, wherein the first database element is mapped to the attribute of the second data tuple.

17. The system of claim 16, wherein the first database element is further mapped to one or more of: (i) at least a first operator of the operator graph of the distributed application, and (ii) the attribute of the second data tuple, wherein locking the second data tuple comprises at least one of: (i) refraining from processing any data tuples by the first operator, (ii) placing the second data tuple in a buffer for locked data tuples and processing a third data tuple by the first operator, and (iii) processing the second data tuple by the first operator without changing any attribute values of the second data tuple, wherein the value of the first database element comprises a database key, wherein one of: (i) the database key, and (ii) a portion of the database key is matched to the attribute value of the second data tuple to identify the second data tuple.

18. The system of claim 15, wherein the first one of the DBMS and the distributed application comprises the distributed application, wherein at least one of a first operator processing the first data tuple and the first data tuple are predetermined to modify the second database element, wherein the second database element comprises one or more of: (i) a database, (ii) a database table, (iii) a database record, and (iv) a database column.

19. The system of claim 15, the operation further comprising:
unlocking, by the first one of the DBMS and the distributed application, the one of the first database element and the first data tuple;
transmitting an indication of the unlocking by the first one of the DBMS and the distributed application to the second one of the DBMS and the distributed application; and
unlocking, by the second one of the DBMS and the distributed application, the identified one of the second database element and the second data tuple.

20. The system of claim 15, wherein the identified one of the second database element and the second data tuple are unlocked upon determining a corresponding lock timeout has expired, wherein the lock timeout is based on one or more of: (i) a rate of flow of data tuples in the distributed application, (ii) a count of operators the second data tuple has traveled through, (iii) a type of lock applied to the first database element, and (iv) a type of commitment control used by the DBMS, wherein the distributed application comprises:
a plurality of processing elements comprising one or more operators, the operators configured to process data tuples, wherein the plurality of processing elements execute on at least one compute node of a plurality of compute nodes; and
the operator graph of a plurality of operators, the operator graph defining at least one execution path in which a first operator of the plurality of operators is configured to: (i) receive data tuples from at least one upstream operator and (ii) transmit data tuples to at least one downstream operator.

* * * * *